Patented Apr. 7, 1942

2,278,636

UNITED STATES PATENT OFFICE 2,278,636

RESIN OF INTERPOLYMERIZED SUBSTANCES COMPRISING ACRYLIC OR METHACRYLIC ANHYDRIDE

Carl E. Barnes, Worcester, Mass., assignor, by mesne assignments, to E. I. du Pont de Nemours & Company, Wilmington, Del., a corporation of Delaware No Drawing. Application November 9, 1939, Serial No. 303,707

5 Claims. (Cl. 260—84)

This invention relates to synthetic resins and more particularly to interpolymerized compounds containing unsaturated methylene groups.

It has been found that various monomeric unsaturated methylene compounds, such as methyl methacrylate, polymerize to form highly transparent and tough resins. But such compounds may have too low a softening point or they may be too easily scratched for various special uses. These substances may, however, have their hardness increased and their softening point raised by interpolymerization with acrylic anhydride and methacrylic anhydride. These anhydrides contain two independently polymerizable unsaturated methylene groups per molecule; and during polymerization with another substance containing but one of these groups, the growing chains incorporate molecules of both substances and form an interpolymer having a three dimensional structure wherein the linkages are established between the chains to an extent depending upon the amount of cross linking agent used. These anhydrides are very active cross linking agents and make very hard and satisfactory bodies for many uses. It, however, is desirable to produce resins which are both hard and stronger than those produced by such a cross linking agent, or to modify other characteristics of the copolymer, such as the softening point or solubility without losing the desirable properties imparted by the anhydride.

It is the primary object of this invention to overcome that problem and to provide a copolymer of various base subtsances with modifying agents which will provide desired properties relative to strength, softening point, solubility and hardness or other charcteristics and thus making a body which is suitable for use in various fields.

A further object is to modify the properties of a chosen base substance and provide a transparent resin which is both hard and strong and which can be readily shaped by a grinding and polishing operation so as to give an optical image. Further objects will be apparent in the following disclosure.

In accordance with this invention, I propose to copolymerize various base substances containing a single unsaturated methylene group with acrylic or methacrylic anhydride in a limited amount of not over 7 to 10% by weight to impart desired hardness characteristics thereto and with a compatible and miscible amount of a further modifying agent which improves the strength or adds further desirable properties. The base substances comprise:

The methyl and ethyl alcohol esters of acrylic and methacrylic acids, i. e., methyl acrylate, ethyl acrylate, methyl methacrylate and ethyl methacrylate;

Methyl vinyl ketone, methyl isopropenyl ketone and styrene.

As a modifying agent for changing and improving the properties of the resin formed by the other two substances, I employ ethylidene diacrylate or ethylidene dimethacrylate which are the esters of acrylic and methacrylic acid with the hypothetical ethylidene glycol alcohol.

The acrylic and methacrylic anhydrides are desirable cross linking and hardening agents for interpolymerization with the various base substances above listed, and particularly with methyl methacrylate. But, if only 7 to 10% of the cross linking agent, such as methacrylic anhydride, is used, the cross linkages between the chains may be too infrequent to give a required strength or a high enough softening point or a sufficiently low solubility for many uses and particularly in the optical field.

I have found that ethylidene diacrylate and ethylidene dimethacrylate will further increase the strength or improve other properties of the copolymer formed by the base substance and the anhydride without rendering the material too highly strained or making it too brittle for many desired purposes. These ethylidene compounds are specifically described and claimed in the copending application of Loring Coes, Jr., Serial No. 239,533 filed November 8, 1938, and they may be made as there set forth. That is, the monomeric ethylidene methacrylate may be prepared by the addition of acetylene to methacrylic acid, using a suitable catalyst, such as mercuric sulfate or boron trifluoride. For example, I may dissolve five grams of mercuric oxide in 100 cc. of glacial acetic acid heated to a temperature of 85 to 90° C. with vigorous stirring. To this mixture is added 3.3 c.c. (1% excess) of concentrated sulfuric acid mixed with 5 c. c. of glacial acetic acid, and the mixture is added dropwise during stirring to the mercuric acetate solution. The mercuric sulfate is then allowed to settle and the greater part of the acetic acid is drawn off by suction. Most of the sulfuric acid is washed out of the catalyst by the addition of 100 c.c. of glacial acetic acid and drawing off all but about 25 c. c. To this catalyst, 100 c. c. of 100% mercury methacrylic acid containing pyrogallol as a polymerization inhibitor is added, and the mixture heated to 85 to 90° C. Acetylene gas, after passing through sulfuric acid, is added to the mixture at the rate of about 8 liters per hour. The gases issuing from the reaction flask are passed through a trap cooled in ice water which collects a considerable quantity of vinyl methacrylate. At the end of six or eight hours, the catalyst is filtered off and the filtrate is combined with the liquid from the trap. The mixture is diluted with ether and the ether solution washed with aqueous sodium carbondate until neutral. After drying the ether solution with calcium chloride, it is distilled in order first to remove the volatile ether and vinyl acetate and then to separate the products. The first product collected is vinyl methacrylate which boils at 48° C. at 60 mm. pressure. The ethylidene dimethacrylate which comes over next boils at 89 to 91° C. at 11 mm. Inasmuch as the ethylidene dimethacrylate is formed by the addition of another mol of acetylene to the vinyl methacrylate, conditions may be so controlled as to increase the yield of the ethylidene diamethacrylate.

Pure monomeric ethylidene dimethacrylate is a colorless liquid which boils at 75° C. at 3 mm. pressure and has a faint odor. It is insoluble in water and has a density greater than 1.0. It polymerizes to a hard, brittle solid having many cracks, but when used in suitable proportions as herein set forth an interpolymer may be made which is not subject to severe strains or cracking. The polymer of ethylidene dimethacrylate is a colorless, highly transparent homogenous mass having an index of refraction for the sodium line of 1.49, which is substantially the same as that of methyl methacrylate, so that the two may be polymerized in all proportions without materially varying the index. The index of refraction of such an interpolymer may be modified by the addition of other polymerizable substances of lower or higher indices.

The interpolymers of the base substance with the anhydride and the ethylidene ester of acrylic or methacrylic acid may be made by mixing the monomers thereof in any proportions in which the materials are fully miscible or are soluble in one another, so that the interpolymers are formed as homogenous one phase substances. The proportions used determine the properties of the product. Ordinarily, I use not over 50% of the ethylidene compound and preferably about 10 to 20%, although lesser amounts are often desirable.

As specific examples illustrating various phases of this invention, I may make a triple polymer for use as an optical body comprising methyl methacrylate copolymerized with 7% of methacrylic anhydride and 10% of ethylidene glycol methacrylate, which are miscible in their monomeric liquid forms and may be polymerized by standard procedure, such as heating the mixture in a mold at 60° C. The product is a transparent hard body that is not strained or cracked detrimentally. As a further example, I may copolymerize methyl methacrylate with 7% of methacrylic anhydride and 15% of ethylidene acrylate to form a similarly useful body. I may use much smaller proportions of the anhydride and larger amounts of the ethylidene ester or vice versa, as required to form different types of resins for use as abrasive bonds and molded articles of various utilities.

It will now be appreciated that one may substitute the other above listed monohydric alcohol esters of the acrylic and methacrylic acids for the methyl methacrylate given in the examples. Likewise, styrene, methyl vinyl ketone and methyl isopropenyl ketone are useful as base substances and they may be brought to that degree of hardness and strength which renders them fit for use as optical bodies, abrasive bonds and molded bodies, etc., by being hardened with acrylic or methacrylic anhydride up to the limit of about 10% of the anhydride and by having their properties further modified by the use of up to about 50% of ethylidene glycol esters of acrylic and methacrylic acids. The proportions above specified will serve for each of the base substances, but they may be varied widely.

The interpolymers may be used for bonding various types of granular materials, such as abrasive grains, and in such cases the proportion of the modifying agents employed will be governed by the requirements of the final product. If abrasive grains, such as crystalline alumina, silicon carbide, boron carbide or diamonds, are to be bonded by the interpolymer, the mixture of chosen monomeric substances may be incorporated with the grain in desired proportions and the bond polymerized by heat, with or without the aid of catalysts, such as benzoyl peroxide. Suitable procedure may be adopted for making such bonded articles in accordance with the methods set forth in the applications of Kistler and Barnes Serial No. 187,549 filed January 28, 1938, and Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, the monomeric polymerizable mixture may be used only in sufficient amount to wet the grains and be solidified by polymerization in the presence thereof. Other suitable procedures as set forth in the prior applications may be employed with the base substance and the modifying agents herein disclosed and this invention is deemed to cover the products thus made.

It is to be understood that while I have attempted to explain this invention in the light of the present accepted theories, yet the claims are not to be construed as dependent on any particular theory relative to the formation of these copolymers. Also, the examples above given are to be interpreted solely as illustrating the invention and not as limitations thereon, except as set forth in the claims appended hereto.

This case in a continuation in part of my co-pending application Serial No. 253,625 filed January 30, 1939.

I claim:

1. A resin formed of interpolymerized substances comprising styrene interpolymerized with not over 10% of a substance selected from the group consisting of the acrylic and methacrylic anhydrides and further polymerized with a substance selected from the group consisting of the ethylidene glycol esters of acrylic and methacrylic acids.

2. An interpolymer of methyl methacrylate with not over 10% of methacrylic anhydride and a miscible amount of ethylidene acrylate.

3. An interpolymer of methyl methacrylate, not over 10% of methacrylic anhydride and a miscible amount of ethylidene methacrylate.

4. A resin formed of copolymerized substances comprising not over 10% by weight of an anhydride of an acid selected from the group consisting of the acrylic and methacrylic acids copolymerized with the ethylidene glycol ester of one of said acids and with a compatible polymerizable unsaturated mono-methylene compound which constitutes the major portion of the mass and forms a homogenous resin.

5. A resin formed of copolymerized substances comprising not over 10% by weight of methacrylic anhydride copolymerized with ethylidene glycol dimethacrylate and a compatible polymerizable unsaturated mono-methylene compound which constitutes the major portion of the resin and forms a homogenous mass.

CARL E. BARNES.